June 19, 1962
L. PÉRAS
3,039,578
CLUTCHES
Filed Nov. 5, 1959
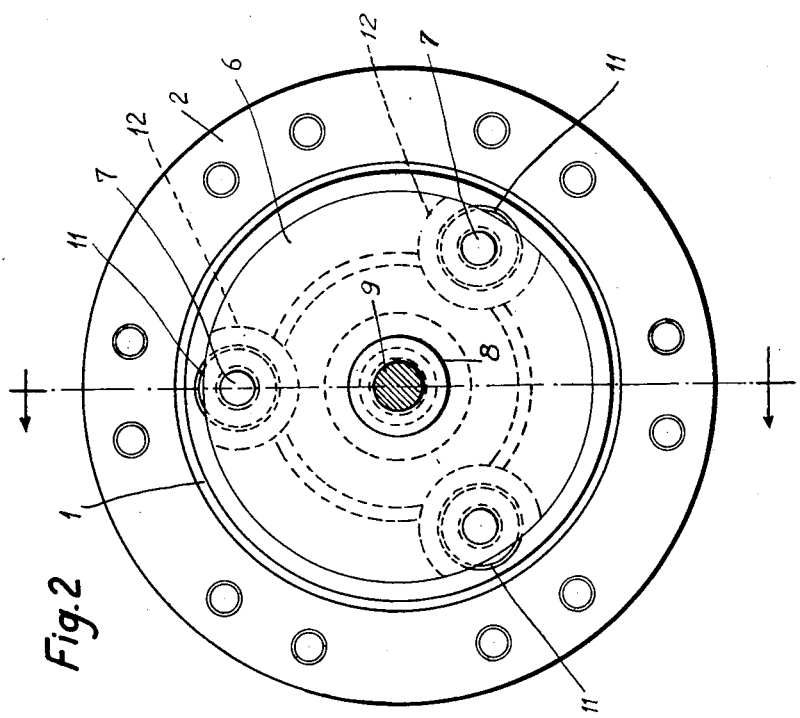
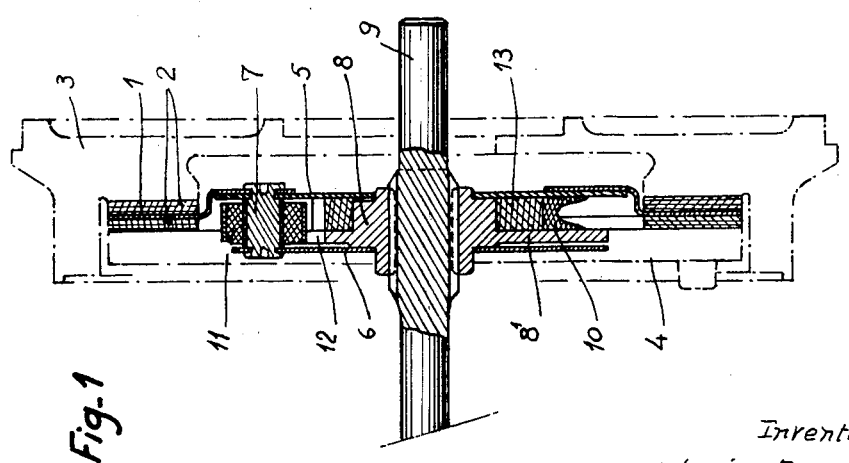
Inventor
Lucien Péras
By Stevens Davis Miller & Mosher
Attorneys

United States Patent Office 3,039,578
Patented June 19, 1962

3,039,578
CLUTCHES
Lucien Péras, Billancourt, France, assignor to Regie Nationale des Usines Renault, Billancourt, France
Filed Nov. 5, 1959, Ser. No. 851,157
Claims priority, application France Nov. 18, 1958
3 Claims. (Cl. 192—107)

The present invention relates in general to clutches and has specific reference to improvements in the torque damping devices or buffers usually incorporated in these apparatus.

Conventional buffers consist of coil compression springs the rate of operation of which, being relatively high due to their moderate dimensions, is a cause of frequent failures. On the other hand, the torque damping action is nearly zero in most cases or the arrangements are such that the shock-absorbing function normally to be expected from these mechanisms is seldom obtained under mass-production conditions.

The improvements constituting the subject-matter of the present invention concerns a resilient system comprising a rubber torus or annulus, or in some instances rubber blocks, subjected to shearing stress and providing a damping action of their own.

The angular flexibility of this elastic system is made relatively high so that it will not transmit the torsional vibration from the crankshaft to the driven shaft in the usual speed range when the driver uses the inertia and resistance of the engine as a braking or retarding force.

This relatively high flexibility, when the engine torque is used under normal conditions, involves the transmission of the available torque through the medium of thrust members, also of resilient character with a view to avoid detrimental shocks, which are engaged by bearing surfaces provided to this end. Now this thrust system is a part either of the first resilient system as set forth hereinabove, or of a separate system.

In order to afford a clearer understanding of this invention and of the manner in which the same may be carried out in practice, reference will now be made to the accompanying drawing showing diagrammatically by way of example a typical form of embodiment of a clutch constructed according to the teachings of this invention and wherein the resilient blocks through which the engine torque is normally transmitted are independent of the elastic torque damping device proper. In the drawing:

FIGURE 1 is an axial section of the clutch, and
FIGURE 2 is a front view of the clutch.

Referring to the drawing, the reference numeral 1 designates a clutch disc provided with clutch linings 2 and adapted to be clamped between the flywheel 3 rigid with the engine shaft and the movable clutch plate 4.

The disc 1 is assembled with the pair of sheet-metal discs 5, 6 by means of spacers 7 having their ends clinched on the outer faces of these discs. These discs 5, 6 are guided by, and bear with their inner edges on, the lateral edges of the hub 8 rigid with the driven shaft 9 and formed with an integral flange $8^1$.

A toroidal or like annular member 10, of rubber or like elastic material, having preferably the cross-sectional shape shown in the lower half of FIG. 1 is connected by gluing or moulding to the flange $8^1$ of hub 8 and also to the sheet-metal disc 5. If desired, a number of rubber or like blocks or pads disposed at spaced intervals on the periphery of the flange $8^1$ and disc 5 may be substituted for the annular member 10.

Threaded on the spacers 7 are resilient blocks 11, for example of rubber, mounted in cages consisting of inner and outer metal rings.

The flange $8^1$ of hub 8 is formed at spaced angular intervals with notches 12, three of them being provided in the example illustrated, these notches surrounding with an adequate clearance the resilient blocks 11 and being engaged by these blocks under the conditions set forth hereafter.

The notches 12 of flange $8^1$ are adapted, during their angular movement, to bear against the outer cages or rings of the resilient blocks 11 during the transmission of substantial torques that are either continuous or of exceptional character, this engagement occurring in either direction of drive.

Finally, a friction ring 13 is interposed between the sheet-metal disc 5 and the flange $8^1$ of hub 8; thus, any relative movement between these two members will produce a frictional engagement with the ring 13 which will therefore act as a friction-type damper between the driving disc and the driven hub. This friction damping device, which must sometimes be associated with the specific resilient system constituted by the rubber or like annular member 10, may be pre-compressed initially, that is, when moulding or gluing the member 10. Moreover, the greater the angular shift of the lateral faces of ring 10, the higher the compression effort supported by the ring 13 and therefore the greater the damping action. This additional compression of the friction damping device during the application of a torque will result from the shearing stress supported by the rubber material which tends to move the lateral faces attached to the faces carried by the disc 5 and flange $8^1$ toward each other.

Under these conditions, a system providing a damping action variable with the torque transmitted is obtained, which is moderately effective under low torque conditions but highly effective against high torques.

This device operates as follows:

Assuming that a low torque, for example that corresponding to the retarding torque of the engine, is applied; the rubber ring 10 will be subjected to shear and if an additional damping action is required the necessary complement will be obtained from the friction ring 13.

The notch 12 formed in flange $8^1$ will then permit such an angular shift that the engagement against the resilient blocks 11 will be avoided.

The system will then act as a torsion-resisting damping unit and will prevent the propagation of transmission noises due to the torsional vibration of the engine during its operation as a braking or retarding unit.

At low torques and in the normal direction of rotation of the engine, the same result is obtained and when the engine torque becomes sufficient, the resilient blocks 11 contact the notches 12; thus, the flexibility of the assembly will vary suddenly and from that moment on, while maintaining a moderate flexibility, the operative connection between the engine and the transmission, under full torque conditions, takes place without jerks and very smoothly. The damping action ensured by the friction member 13 is maximum due to the relatively important angular shift of the side faces of the rubber ring 10.

Of course, many modifications may be contemplated in the practical embodiment of this invention, notably in connection with relative size and proportions of the parts, the material used in their manufacture and various constructional details, without however departing from the spirit and scope of the invention as set forth in the appended claims.

I claim:
1. In a friction clutch, a hub, a disc bearing on the hub, a clutch disc bearing on the hub, spacers connecting the clutch disc and the disc, said hub having an annular flange disposed between the discs, a rubber annular arrangement secured to the hub flange and to the clutch disc to constitute a torsion damping system at low torques and rubber blocks fixedly circumposed on the spacers, said hub flange having notches receiving the rubber blocks with the blocks engaging the sides of the notches under high torque conditions.

2. In a friction clutch, a hub, a disc bearing on the hub, a clutch disc bearing on the hub, spacers connecting the clutch disc and the disc, said hub having an annular flange disposed between the discs, a rubber annular arrangement secured to the hub flange and to the clutch disc to constitute a torsion damping system at low torques, rubber blocks fixedly circumposed on the spacers, said hub flange having notches receiving the rubber blocks with the blocks engaging the sides of the notches under high torque conditions, and a friction ring interposed between the clutch disc and the hub flange and providing an additional damping action through frictional engagement between said clutch disc and the hub.

3. The combination of claim 1, wherein said rubber annular arrangement consists of a rubber ring.

References Cited in the file of this patent
UNITED STATES PATENTS

| | | |
|---|---|---|
| 1,723,886 | Pfaff | Aug. 6, 1929 |
| 1,767,566 | Updike | June 24, 1930 |
| 1,818,610 | Eaton | Aug. 11, 1931 |
| 1,912,703 | Gamble | June 6, 1933 |
| 2,533,789 | Goodchild | Dec. 12, 1950 |
| 2,828,616 | Zeigler et al. | Apr. 1, 1958 |